United States Patent
Huang et al.

(10) Patent No.: US 6,940,890 B2
(45) Date of Patent: Sep. 6, 2005

(54) POSITION AND ADJUSTMENT DEVICE USING LASER MODULE

(75) Inventors: Chao-Chi Huang, Taipei (TW); Yu-Hsi Yang, Taipei (TW)

(73) Assignee: Quarton, Inc. (TW)

( * ) Notice: Subject to any disclaimer, the term of this patent is extended or adjusted under 35 U.S.C. 154(b) by 218 days.

(21) Appl. No.: 10/633,817

(22) Filed: Aug. 4, 2003

(65) Prior Publication Data

US 2004/0125852 A1 Jul. 1, 2004

(30) Foreign Application Priority Data

Dec. 27, 2002 (TW) ..................................... 91221232 U

(51) Int. Cl.⁷ .............................. H01S 3/08; G02B 6/26
(52) U.S. Cl. ......................................... 372/107; 385/53
(58) Field of Search ........................... 372/107; 385/33, 385/52

(56) References Cited

U.S. PATENT DOCUMENTS 5,659,645 A * 8/1997 Satake ........................ 385/33
5,787,631 A * 8/1998 Kendall ....................... 42/116
6,072,814 A * 6/2000 Ryan et al. .................... 372/35

* cited by examiner

Primary Examiner—Minsun Oh Harvey
Assistant Examiner—Philip Nguyen
(74) Attorney, Agent, or Firm—Raymond Sun

(57) ABSTRACT

A position and adjustment device for a laser module has a cylindrical body having a bore therein, the body having a first plurality of openings and a second plurality of openings that are spaced apart around the body. A laser module is positioned inside the bore. The position and adjustment device also has a plurality of bolts, with each bolt extending through a corresponding one of the first openings into the bore, each bolt having an inner end and a rotating ball provided at the inner end and providing a rolling contact with the external surface of the laser module. The position and adjustment device also has a plurality of biased pins, with each pin extending through a corresponding one of the second plurality of openings into the bore, each pin having a curved inner end that provides a point contact with the external surface of the laser module.

18 Claims, 6 Drawing Sheets

POSITION AND ADJUSTMENT DEVICE USING LASER MODULE

BACKGROUND OF THE INVENTION

1. Field of the Invention

The invention relates to a position and adjustment device for a laser module, and in particular, to a laser module adjustment device that adjusts and positions a laser module through the use of steel-ball bolts and elastic abutment by spring pins.

2. Description of the Prior Art

Laser devices are used in many applications. Since a laser beam can be projected for long distances and have strong indication, laser devices are commonly used with positioning and indication devices in the fields of indication and positioning. In addition, laser devices are accurate and are easy to use.

Unfortunately, vibrations can cause the laser module inside a laser positioning to be biased, thereby causing the emitted laser beam to be inaccurate. As a result, it may be necessary to adjust the bias of the laser module. Various laser module adjustment devices have been provided to serve this purpose.

FIG. 1A illustrates one conventional laser module adjustment device 10, which has a barrel-shaped body 11, inside which a laser module 12 is positioned. Two bolts 13 are arranged on two corresponding sides of the axial center of the body 11, and extend through the body 11 to be abutted against the laser module 12. An elastic piece 14 is positioned at the bottom of the laser module 12 inside the body 11. Thus, the bias of the laser module 12 can be adjusted by adjusting the screwing or threading of the bolts 13. The elastic piece 14 exerts an elastic force against the bottom of the laser module 12 and against the force of the bolts 13. However, the device 10 suffers from several drawbacks:

1. The contacting surface between the laser module 12 and the bolt 13 is arc-shaped. Therefore, if only one bolt 13 is adjusted, then a torque will be generated so that the laser module 12 cannot move in a linear manner. This is best illustrated in FIG. 1B. When one bolt 13a is screwed in, the most ideal case is that the laser module 12 should move linearly along the axial direction 131 of the bolt 13a. However, since the surface of the laser module 12 is arc-shaped, a torque will be generated with respect to the surface of the laser module 12 when adjusting the bolt 13a, such that the laser module 12 is biased or even rotated to move away from the axial direction 131 of the bolt 13a. Therefore, it is necessary to adjust another bolt 13b to counter the torque generated by the first bolt 13a. Unfortunately, it is extremely difficult, time-consuming and labor-intensive to simultaneously and accurately adjust both bolts 13a, 13b.

2. After extended use, the elastic piece 14 will experience elastic fatigue, thereby rendering the adjustment device 10 inoperable.

3. The stability of the laser module 12 is poor when the laser module 12 is in use. This is because it is easy for the laser module 12 to generate backward, forth, leftward, and rightward movements or even to rotate if the device 10 experiences vibration.

FIG. 2 illustrates another conventional laser module adjustment device 20, which has a barrel-shaped body 21, inside which a laser module 22 is positioned. Three bolts 23 are arranged in spaced-apart manner about the body 21, and extend through the body 21 to be abutted against the laser module 22. Thus, the bias of the laser module 22 can be adjusted by adjusting the selective screwing or threading of the three bolts 23. However, the device 20 also suffers from several drawbacks:

1. Although the provision of three spaced-apart abutment points provides greater stability for the bolts 23 to be abutted against the laser module 22, the adjustment is more complicated, because three separate bolts 23 must be adjusted simultaneously and carefully to obtain the desired adjustment results.

2. Because the bolts 23 are forcibly abutted against and are rotated on the laser module 22, it is easy to damage the laser module 22 by creating dents thereon after extended usage.

3. Since the contacting surface between the laser module 22 and the bolt 23 is also arc-shaped, if only one bolt 23 is adjusted, then a torque will again be generated which will prevent the laser module 22 from moving in a linear manner. As with the adjustment device 10 above, it will be extremely difficult, time-consuming and labor-intensive to simultaneously and accurately adjust three separate bolts 23.

FIG. 3 illustrates another conventional laser module adjustment device 30, which has a barrel-shaped body 31, inside which a laser module 32 is positioned. Two bolts 33 and two springs 34 are arranged in spaced-apart manner about the body 21, with one bolt 33 and one spring 34 aligned along the same first axis, and the other bolt 33 and spring 34 aligned along the same second axis that is perpendicular to the first axis. The two bolts 33 are positioned adjacent to each other, and the two springs 34 are positioned adjacent to each other as well. A fixing cap 35 is secured over each spring 34. The bolts 33 and the springs 34 extend through the body 31 to be abutted against the laser module 32. Thus, the bias of the laser module 32 can be adjusted by adjusting the selective screwing or threading of the bolts 33, which cooperate with the countering elastic forces of the springs 34. However, the device 30 still suffers from several drawbacks:

1. The stability of the laser module 32 is poor when the laser module 32 is in use. This is because it is easy for the laser module 32 to generate backward, forth, leftward, and rightward movements or even to rotate if the device 30 experiences vibration.

2. Since the contacting surface between the laser module 32 and the bolts 33 is also arc-shaped, if only one bolt 33 is adjusted, then a torque will again be generated which will prevent the laser module 32 from moving in a linear manner. As with the adjustment device 10 above, it will be extremely difficult, time-consuming and labor-intensive to simultaneously and accurately adjust separate bolts 33.

SUMMARY OF THE DISCLOSURE

It is an objective of the present invention to provide a positioning and adjustment device for a laser module that avoids the drawbacks described above.

In order to accomplish the objectives of the present invention, the present invention provides a position and adjustment device for a laser module. The position and adjustment device has a cylindrical body having a bore therein, the body having a first plurality of openings and a second plurality of openings that are spaced apart around the body. A laser module is positioned inside the bore. The position and adjustment device also has a plurality of bolts, with each bolt extending through a corresponding one of the first openings into the bore, each bolt having an inner end and a rotating ball provided at the inner end and providing a rolling contact with the external surface of the laser module. The position and adjustment device also has a plurality of biased pins, with each pin extending through a corresponding one of the second plurality of openings into the bore, each pin having a curved inner end that provides a point contact with the external surface of the laser module.

Thus, the rolling characteristic of the rotating balls minimizes any torque that will be generated between the bolts and the laser module when adjusting the bolts, such that the laser module may be linearly moved according to the axial direction of the bolt being adjusted without rotation or bias to the laser module, with the pin providing an elastic abutment during adjustment.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1A:
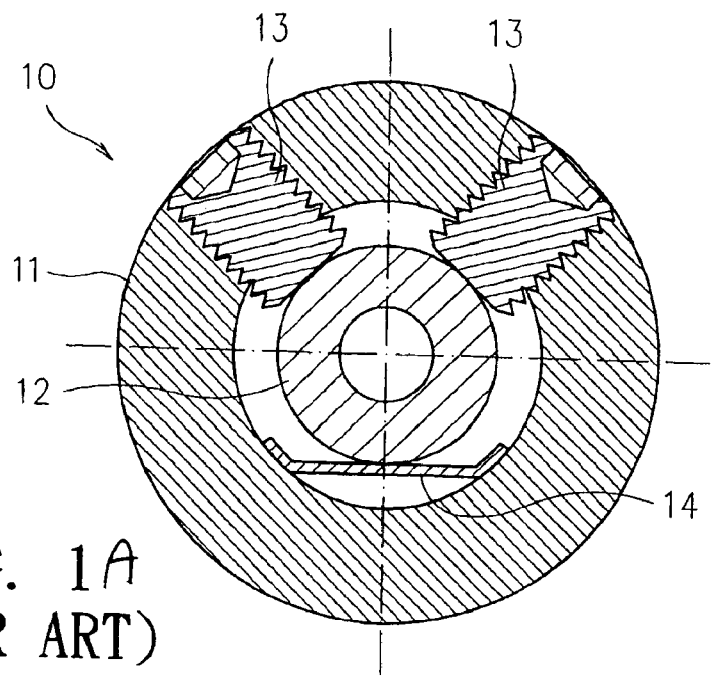
FIG. 1A illustrates one conventional laser module adjustment device.
Figure 1B:
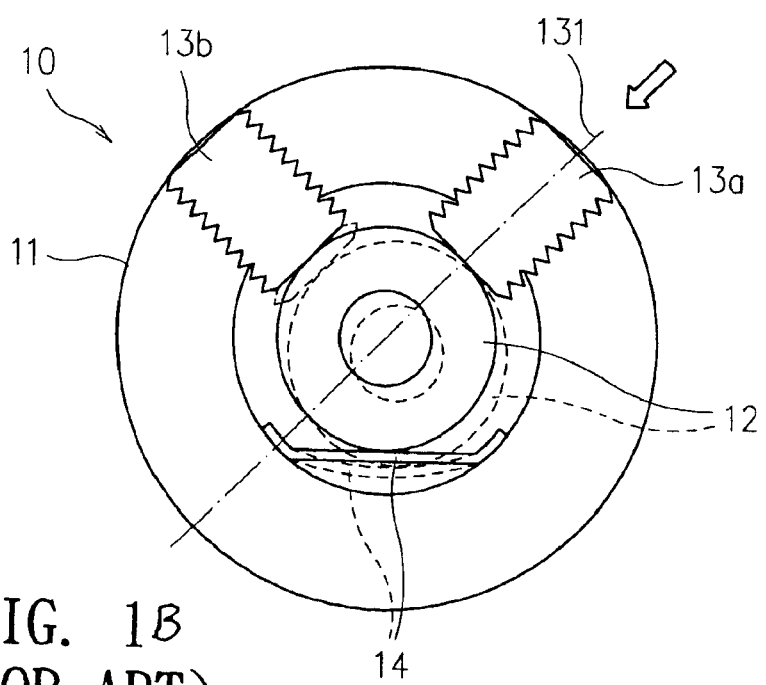
FIG. 1B illustrates the generation of torque in the device of FIG. 1A.
Figure 2:
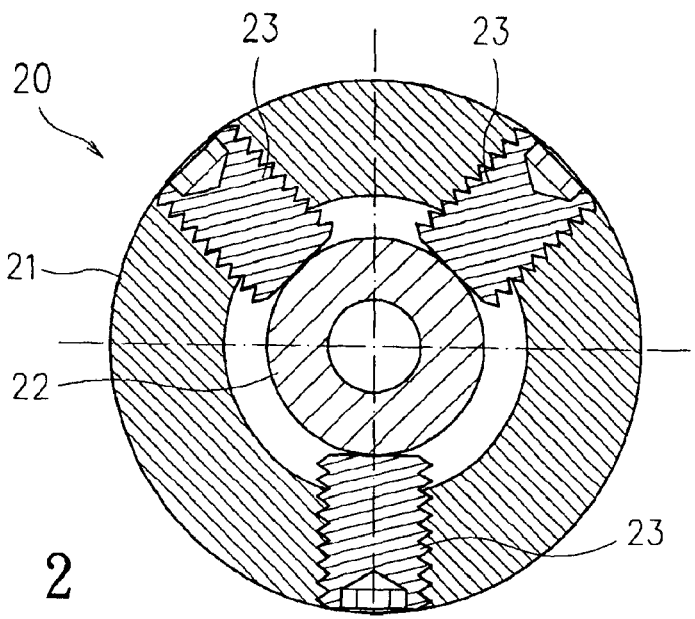
FIG. 2 illustrates another conventional laser module adjustment device.
Figure 3:
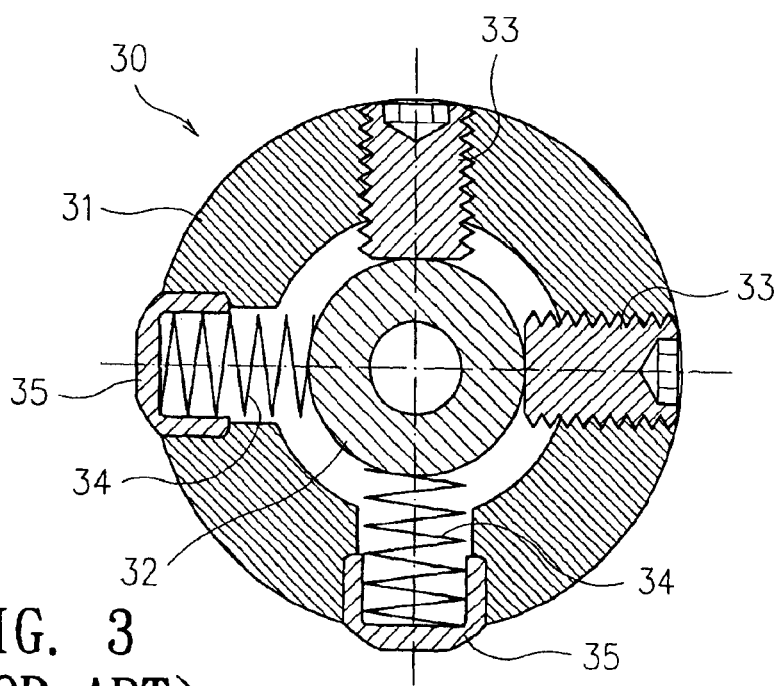
FIG. 3 illustrates yet another conventional laser module adjustment device.
Figure 4:
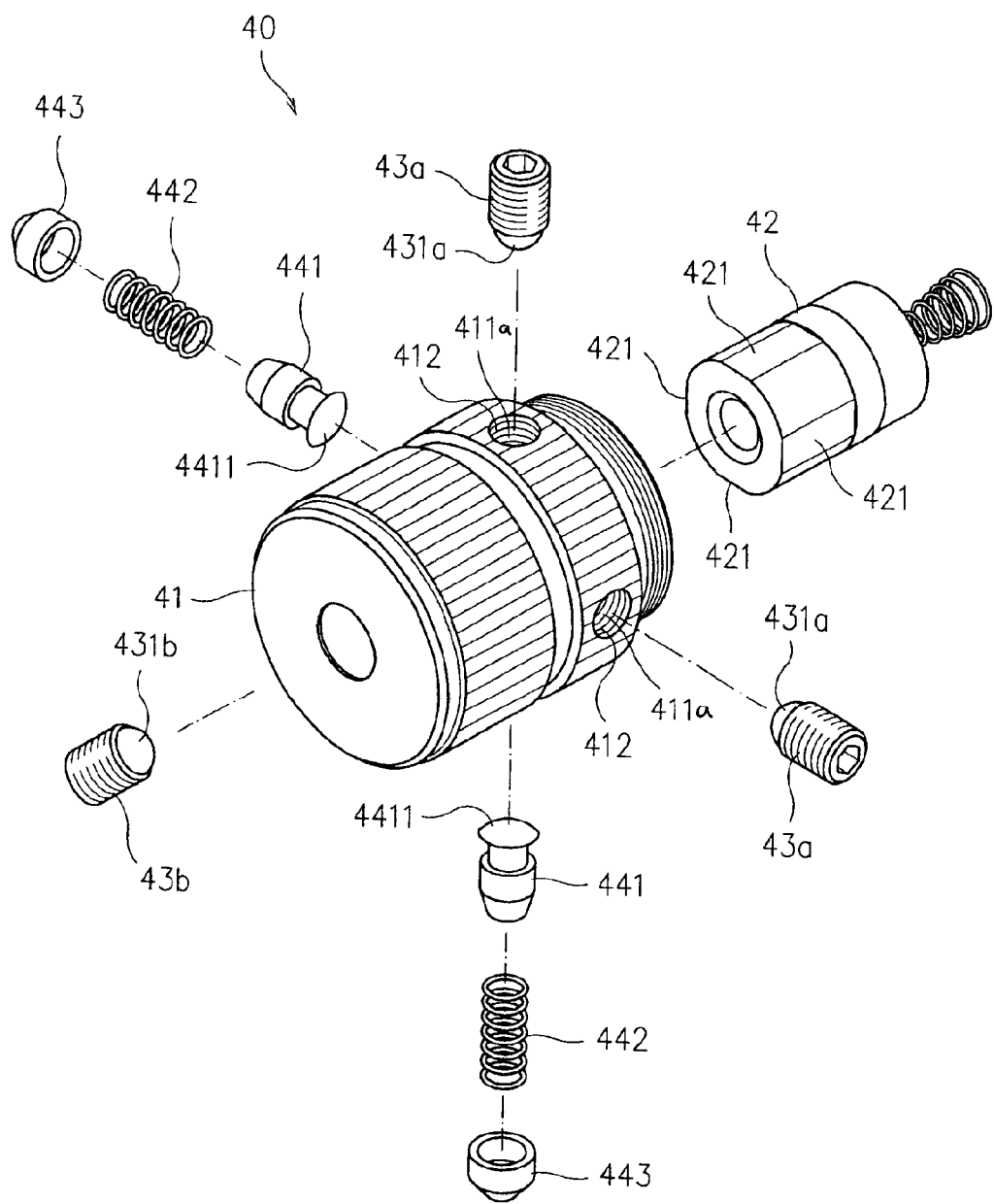
FIG. 4 is an exploded perspective view of one embodiment of a laser module adjustment device according to the present invention.
Figure 5:
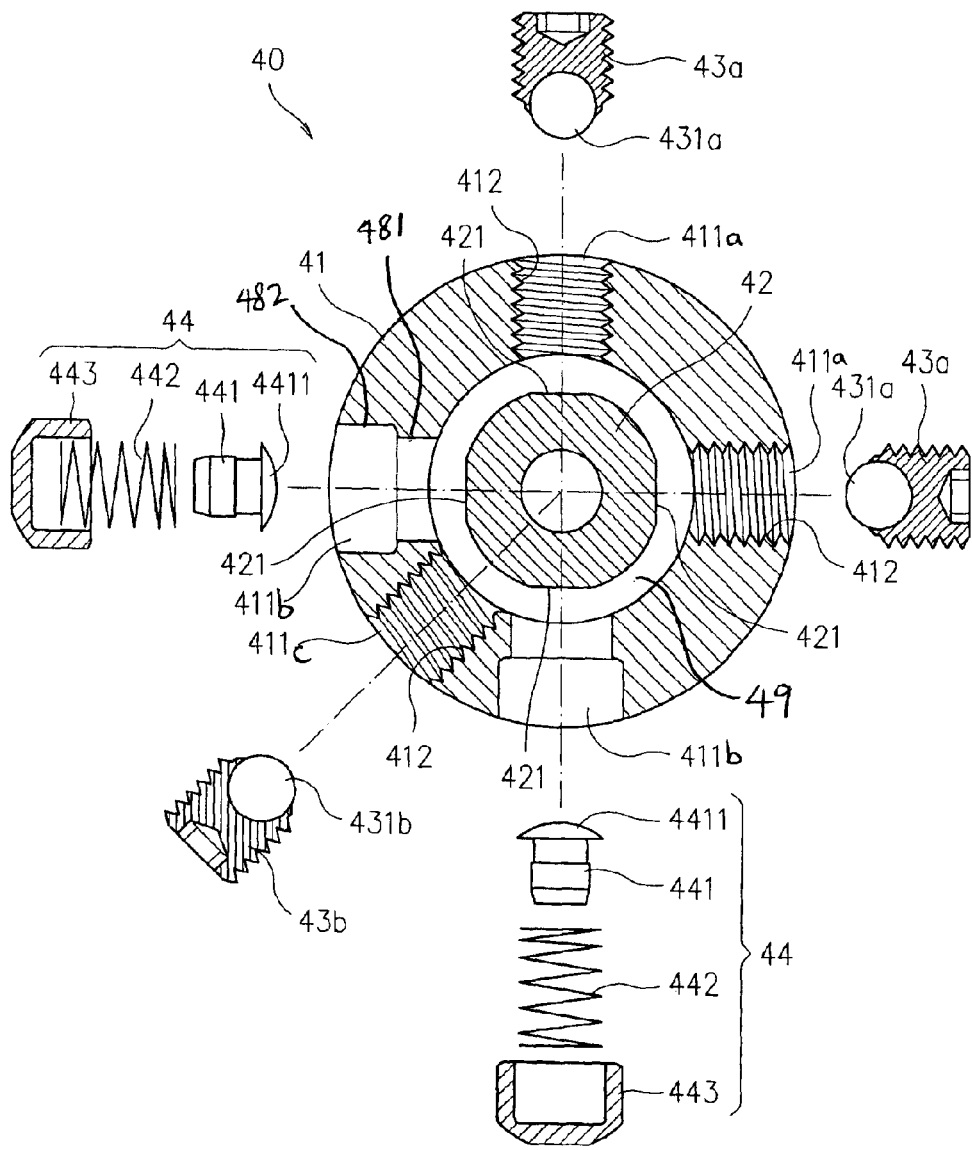
FIG. 5 is an exploded cross-sectional view in the radial direction of the device of FIG. 4.
Figure 6:
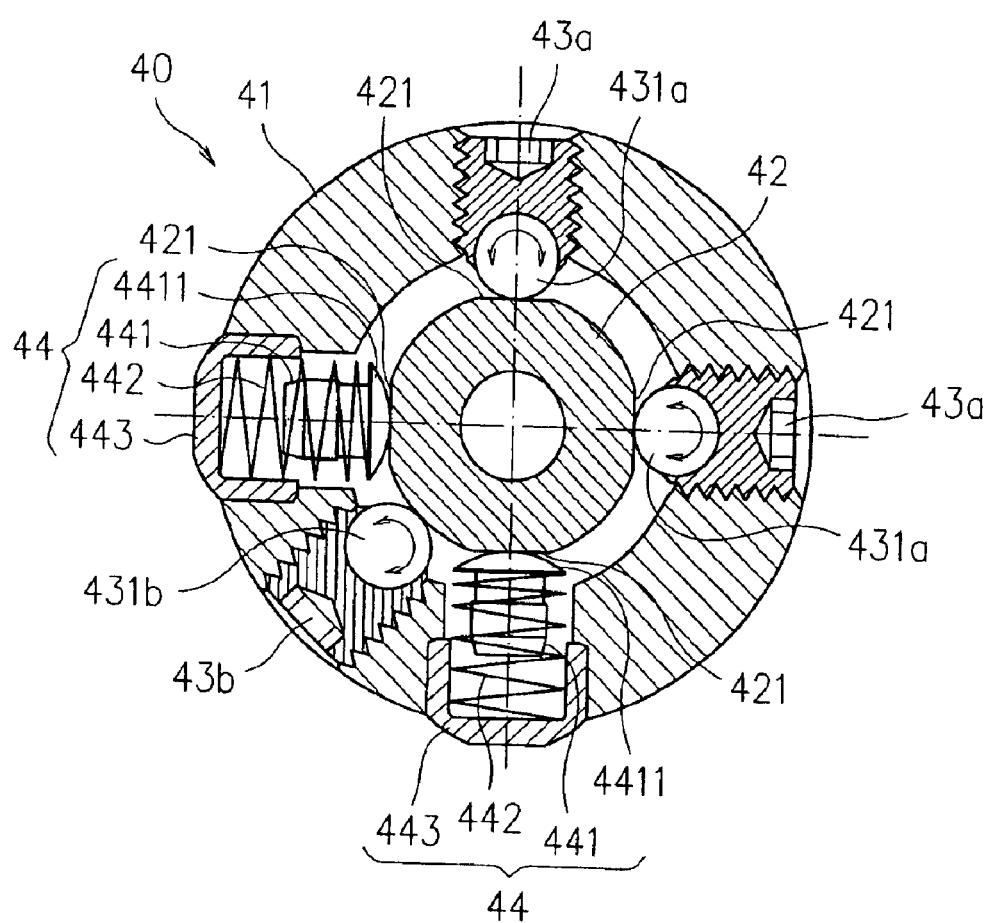
FIG. 6 is a cross-sectional view in the radial direction of the device of FIG. 4.

FIGS. 4–6 illustrate a position and adjustment device 40 according to one embodiment of the present invention. The device has a generally cylindrical body 41 with an internal bore 49. A laser module 42 is positioned in the bore 49. Five openings 411 are provided in the wall of the body 41 and extend in a radial direction into the bore 49. Four of the openings 411a and 411b are spaced apart from each other by about ninety degrees. Two adjacent openings 411a have internal threads for threadably receiving corresponding threaded steel-ball bolts 43a, and another two adjacent openings 411b are adapted to receive corresponding spring pin assemblies 44. Each of the openings 411b has a stepped configuration with a smaller-diameter inner portion 481 adjacent the bore 49, and a larger-diameter outer portion 482. A fifth opening 411c is positioned between the two openings 411b, and has the same threaded construction as the threaded openings 411a. The fifth opening 411c threadably receives a threaded steel-ball bolt 43b. Thus, one threaded opening 411a and one stepped opening 411b are aligned along the same first axis, and the other threaded opening 411a and stepped opening 411b are aligned along the same second axis that is perpendicular to the first axis.

Each spring pin assembly 44 includes a pin 441, a spring 442, and a fixing cap 443, The pin 441 has a convex top 4411, and as best shown in FIGS. 5 and 6, the pin 441 is inserted into the stepped opening 411b with the convex top 4411 pointing towards the bore 49. The spring 442 is fitted around the pin 441 in a manner such that one end of the spring 442 abuts against the convex top 4411. The other end of the spring 442 is secured inside the fixing cap 443. When the spring pin assembly 44 is inserted into the stepped opening 411b, the fixing cap 443 is retained inside the larger-diameter outer portion 482 of the stepped opening 411b, with the stepped transition from the outer portion 482 to the inner portion 481 preventing the fixing cap 443 from extending into the inner portion 481. Most of the pin 441 is positioned inside the inner portion 481. The fixing cap 443 is firmly secured to the body 41 by any known securing mechanism, such as but not limited to press-fitting, friction-fit, glue, bolting, and the like. As shown in FIG. 6, by securing the fixing cap 443 to the body 41, the spring 442 will bias the pin 441 (and its convex top 4411) against the laser module 42 that is seated inside the bore 49.

Each steel-ball bolt 43a and 43b has a rounded inner end that is defined by a steel ball 431a and 431b, respectively. Each steel ball 431a and 431b is capable of rotating. Each steel-ball bolt 43a, 43b has external threads that are threadably attached to the internal threads 412 in the corresponding threaded openings 411a and 411c. As each bolt 43a, 43b is threaded inside the corresponding opening 411a or 411c, the corresponding steel balls 431a, 431b will be abutted against the laser module 42. In addition, to further enhance the stability for abutting the convex tops 4411 (of the pin 441) and the steel balls 431a against the laser module 42, the corresponding contacting surfaces 421 provided on the laser module 42 can be made to be planar and axially vertical to the steel-ball bolts 43a and the spring pins 44. In use, the steel-ball bolt 43b functions to fix and position; in other words, after the two two steel-ball bolts 43a are threaded for adjustment and positioning of the laser module 42, the steel-ball bolt 43b can then be threaded to fix the position of the laser module 42. The steel-ball bolt 43b can provide this function regardless of whether the surface on the laser module 42 that contacts the steel-ball bolt 43b is curved (as shown in FIG. 6) or planar.

Continuing to refer to FIG. 6, since the steel ball 431a of steel-ball bolt 43a can freely rotate and pivot about the contacting surface 421, the steel-ball 431a is always maintained as a point contact with the planar surface 421 without bias or vibration when the steel-ball bolt 43a is being adjusted (i.e., threaded). Similarly, since the convex point 4411 of the pin 441 is curved, the convex top 4411 also forms a point contact with the planar surface 421. These point contacts allow the laser module 42 to move smoothly, but also minimize the possibility of causing dents on the surfaces of the laser module 42. Since the steel-ball bolt 43b also has steel ball 431b that is capable of rolling contact with the surface of the laser module 42, no bias is generated during the threading and fixing of the steel-ball bolt 43b, thereby preventing damage to the surface of the laser module 42.

Figure 7:
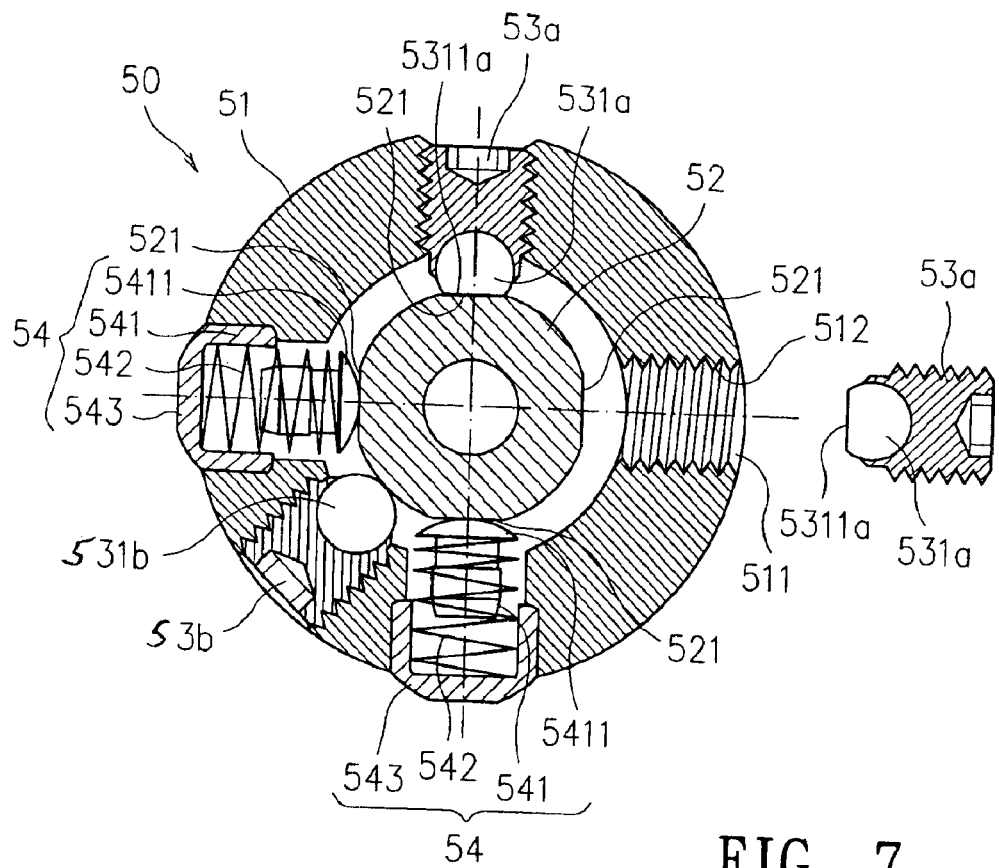
FIG. 7 is a cross-sectional view of another embodiment of a laser module adjustment device according to the present invention.
Figure 8:
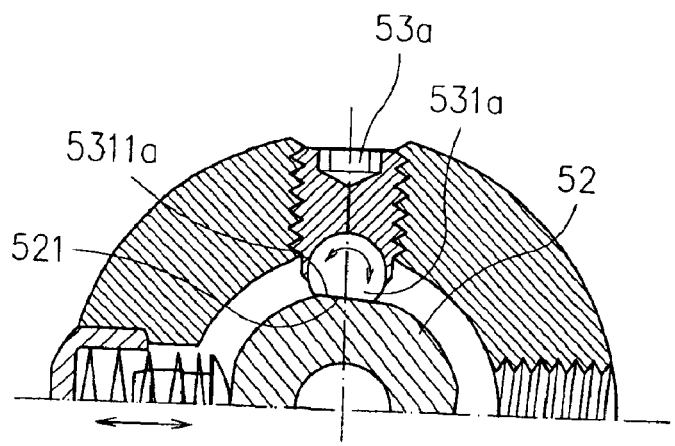
FIG. 8 illustrates the adjustment for the device of FIG. 7.

FIGS. 7–8 illustrate another position and adjustment device 50 according to the present invention. The devices 40 and 50 share many of the same components, so the same numerals are used in both FIGS. 4–6 and 7–8 except that the same components in FIGS. 4–6 begin with a "4" in device 40, and in FIGS. 7–8 begin with a "5" in device 50. For example, the spring pin assemblies 54 in FIGS. 7–8 are identical to the spring pin assemblies 44 in FIGS. 4–6, the steel-ball bolt 53b in FIGS. 7–8 is identical to the steel-ball bolt 43b in FIGS. 4–6, the laser module 52 in FIGS. 7–8 is identical to the laser module 42 in FIGS. 4–6, and the body 51 in FIGS. 7–8 is identical to the body 41 in FIGS. 4–6.

The primary difference between the two devices 40 and 50 is that the steel ball 531a of one or all of the steel-ball bolts 53a in FIGS. 7–8 has a flat contacting plane 5311a which is adapted to be abutted against the planar contacting surface 521 on the laser module 52. Accordingly, since the steel ball 531a can be freely pivoted, when the steel-ball bolt 53a is threaded, the flat contacting plane 5311a of the steel ball 531a will always maintain its abutting relationship with the contacting surface 521 of the laser module 52. This allows the position of the laser module 52 to be adjusted without experiencing any bias (as shown in FIG. 8). In FIGS. 7–8, the contact between the convex top 5411 of the pin 541 and the spring 542 is still a point contact. Thus, the device 50 in FIGS. 7–8 still enjoys the benefits experienced by the device 40 in FIGS. 4–6.

Thus, the present invention provides an important benefit in that no torque is generated between the steel-ball bolts 43a, 43b, 53a, 53b and the laser module 42, 52 when the steel-ball bolts 43a, 43b, 53a, 53b are adjusted because the steel balls 431a, 531a are rotatable and form a point contact with the contacting surface 421, 521. As a result, the laser module 42, 52 can be maintained to move according to the axial direction of the steel-ball bolts 43a, 43b, 53a, 53b without experiencing any rotation or bias.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. An assembly, comprising:
    a cylindrical body having a bore therein, the body having a plurality of first openings and a plurality of second openings that are spaced apart around the body;
    a laser module positioned inside the bore, the laser module having an external surface;
    a plurality of bolts, with each bolt extending through a corresponding one of the plurality of first openings into the bore, each bolt having an inner end and a rotating ball provided at the inner end and providing a rolling contact with the external surface of the laser module; and
    a plurality of biased pins, with each pin extending through a corresponding one of the plurality of second openings into the bore, each pin having a curved inner end that provides a point contact with the external surface of the laser module.

2. The assembly of claim 1, wherein each of the plurality of first openings is threaded.

3. The assembly of claim 1, wherein the external surface of the laser module has a plurality of flat contacting surfaces, with each contacting surface aligned with either a rotating ball of a corresponding bolt or a curved inner end of a corresponding pin.

4. The assembly of claim 1, wherein the plurality of first openings comprises two threaded openings that are positioned adjacent each other and separated by ninety degrees about the body, and the plurality of second openings comprises two second openings that are positioned adjacent each other and separated by ninety degrees about the body.

5. The assembly of claim 4, wherein one of the first openings and one of the second openings are aligned along a first axis, and the other of the first openings and the other of the second openings are aligned along a second axis that is perpendicular to the first axis.

6. The assembly of claim 4, wherein the plurality of first openings includes a third threaded opening that is positioned between the two second openings, and wherein one of the plurality of bolts is retained inside the third threaded opening.

7. The assembly of claim 1, wherein each pin includes:
    a pin having a convex top;
    a fitting cap; and
    a spring positioned around the pin, the spring having a first end abutted against the convex top and a second end secured to the fitting cap.

8. The assembly of claim 7, wherein each of the plurality of second openings has a smaller-diameter inner portion adjacent the bore, and a larger-diameter outer portion, with the fixing cap secured in the outer portion.

9. The assembly of claim 1, wherein each pin is biased towards the bore to exert a bias against the laser module.

10. An assembly, comprising:
    a cylindrical body having a bore therein, the body having a plurality of first openings and a plurality of second openings that are spaced apart around the body;
    a laser module positioned inside the bore, the laser module having an external surface;
    a plurality of bolts, with each bolt extending through a corresponding one of the plurality of first openings into the bore, each bolt having an inner end and a rotating ball provided at the inner end, with at least one rotating ball having a flat edge that contacts with the external surface of the laser module; and
    a plurality of pins, with each pin extending through a corresponding one of the plurality of second openings into the bore, each pin having a curved inner end that provides a point contact with the external surface of the laser module.

11. The assembly of claim 10, wherein each of the plurality of first openings is threaded.

12. The assembly of claim 10, wherein the external surface of the laser module has a plurality of flat contacting surfaces, with each contacting surface aligned with either a rotating ball of a corresponding bolt or a curved inner end of a corresponding pin.

13. The assembly of claim 10, wherein the plurality of first openings comprises two threaded openings that are positioned adjacent each other and separated by ninety degrees about the body, and the plurality of second openings comprises two second openings that are positioned adjacent each other and separated by ninety degrees about the body.

14. The assembly of claim 13, wherein one of the first openings and one of the second openings are aligned along a first axis, and the other of the first openings and the other of the second openings are aligned along a second axis that is perpendicular to the first axis.

15. The assembly of claim 13, wherein the plurality of first openings includes a third threaded opening that is positioned between the two second openings, and wherein one of the plurality of bolts is retained inside the third threaded opening.

16. The assembly of claim 10, wherein each pin includes:
    a pin having a convex top;
    a fitting cap; and
    a spring positioned around the pin, the spring having a first end abutted against the convex top and a second end secured to the fitting cap.

17. The assembly of claim 16, wherein each of the plurality of second openings has a smaller-diameter inner portion adjacent the bore, and a larger-diameter outer portion, with the fixing cap secured in the outer portion.

18. The assembly of claim 10, wherein each pin is biased towards the bore to exert a bias against the laser module.

* * * * *